(12) United States Patent
Deinert et al.

(10) Patent No.: US 6,228,432 B1
(45) Date of Patent: May 8, 2001

(54) METHOD AND APPARATUS FOR THE PRODUCTION OF CONTINUOUS COMPOSITE MATERIALS

(76) Inventors: Juergen Deinert, Goettinger Strasse 20, D-37115, Duderstadt (DE); Maximilian Segl, Niedersachsenring 8, D-37434, Gieboldehausen (DE); Leonhard Trutwig, Teistungerstrasse 31, D-37115, Duderstadt (DE)

( * ) Notice: Subject to any disclaimer, the term of this patent is extended or adjusted under 35 U.S.C. 154(b) by 0 days.

(21) Appl. No.: 09/285,735

(22) Filed: Apr. 5, 1999

(30) Foreign Application Priority Data

Apr. 4, 1998 (DE) ............................................... 198 15 184

(51) Int. Cl.$^7$ ........................................................ B05D 1/18
(52) U.S. Cl. .................................... 427/434.6; 427/434.4; 118/420; 118/117
(58) Field of Search ..................................... 118/419, 420, 118/117, 115, 116; 427/434.6, 314, 175, 369, 434.4; 68/158, 43; 425/104; 366/300

(56) References Cited

U.S. PATENT DOCUMENTS

| | | |
|---|---|---|
| 3,235,437 | 2/1966 | Varlet .................................... 156/561 |
| 3,640,101 | * 2/1972 | Wilcox . |
| 4,883,625 | 11/1989 | Glemet et al. ..................... 264/434.6 |
| 4,957,422 | 9/1990 | Glemet et al. ......................... 425/114 |
| 5,137,766 | 8/1992 | Mazanek et al. ....................... 428/68 |
| 5,158,806 | 10/1992 | Unger .................................... 427/359 |
| 5,690,741 | 11/1997 | Dürr et al. ............................ 118/404 |
| 6,045,876 | * 4/2000 | Fellers et al. . |

FOREIGN PATENT DOCUMENTS

| | | |
|---|---|---|
| 41 12 129 | 10/1992 | (DE) . |
| 0 102 159 | 3/1984 | (EP) . |
| 0 287 427 | 10/1988 | (EP) . |
| 0 397 506 | 11/1990 | (EP) . |
| 0 415 517 | 3/1991 | (EP) . |

* cited by examiner

Primary Examiner—Brenda A. Lamb
(74) Attorney, Agent, or Firm—Foley & Lardner

(57) ABSTRACT

A method and an apparatus for the production of continuous composite materials from unidirectional reinforcing fibers and from thermoplastics, the longitudinally moved bundle of parallel continuous reinforcing fibers being preheated and impregnated with a continuously supplied thermoplastic melt, whereupon the continuous composite material thus formed is cooled. In order to improve the impregnating operation, it is proposed, according to the invention, that the thermoplastic melt form an elongate impregnation stage, into which mechanical energy is introduced continuously in order to reduce the melt viscosity, and that the preheated fiber bundle be drawn continuously through the zone of reduced melt viscosity.

13 Claims, 4 Drawing Sheets

METHOD AND APPARATUS FOR THE PRODUCTION OF CONTINUOUS COMPOSITE MATERIALS

BACKGROUND OF THE INVENTION

1. Field of the Invention

The present invention relates to methods for the production of continuous composite materials from unidirectional reinforcing fibers and from thermoplasitics, wherein a longitudinally moved bundle of parallel continuous reinforcing fibers is preheated and impregnated with a continuously supplied thermoplastic melt, and whereupon the continuous composite material thus formed is cooled.

The invention relates, furthermore, to an apparatus suitable for carrying out a method of this kind.

2. Description of Related Art

A method of this kind is disclosed in DE 41 12 129 A1. In this German document, melted thermoplastic is applied to a moved fiber bundle from a fixed point; the fiber bundle is then impregnated with the thermoplastic, whereby at most 3% by weight of the plastic may be stripped off.

EP 0,102,159 B1 discloses a comparable method, in which viscosity-reducing additives are used in order to lower the melt viscosity.

EP 0,287,427 B1 and EP 0,415,517 A1 disclose methods, in which, in order to be impregnated, the fiber bundles are drawn in the region where the outlet of the thermoplastic melt is located by baffles.

SUMMARY OF THE INVENTION

An object on which the invention is based is to improve the initially described method for example, in terms of the degree and rate of impregnation that is obtainable, as well as to develop suitable apparatus for this purpose.

In accordance with these and other objects, there is provided a method for the production of continuous composite materials from unidirectional reinforcing fibers and from thermoplastics, comprising:

preheating a longitudinally moved bundle of parallel continuous reinforcement fibers, impregnating the bundle with a continuously supplied thermoplastic melt to form continuous composite material, cooling the continuous composite material, wherein the thermoplastic melt forms an elongate impregnation stage, introducing mechanical energy continuously into the impregnation stage in order to reduce the viscosity of the melt so as to form a zone of reduced melt viscosity, and continuously drawing the preheated fiber bundle through the zone of reduced melt viscosity.

In further accordance with the present invention there is provided an apparatus for the production of continuous composite materials comprising a heated closed impregnating appliance. The impregnating appliance comprises (i) at least one introduction nozzle for a fiber bundle be impregnated, (ii) a guide duct which connects the introduction nozzle to an outlet, (iii) at least one supply line for supplying thermoplastic melt to the appliance, the supply line opening into the guide duct, and (iv) at least one movable shearing element for applying mechanical energy to the thermoplastic melt in the guide duct.

Additional objects, features and advantages of the invention will be set forth in the description which follows, and in part will be obvious from the description, or may be learned by practice of the invention. The objects, features and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF A PREFERRED EMBODIMENT

Figure 2:
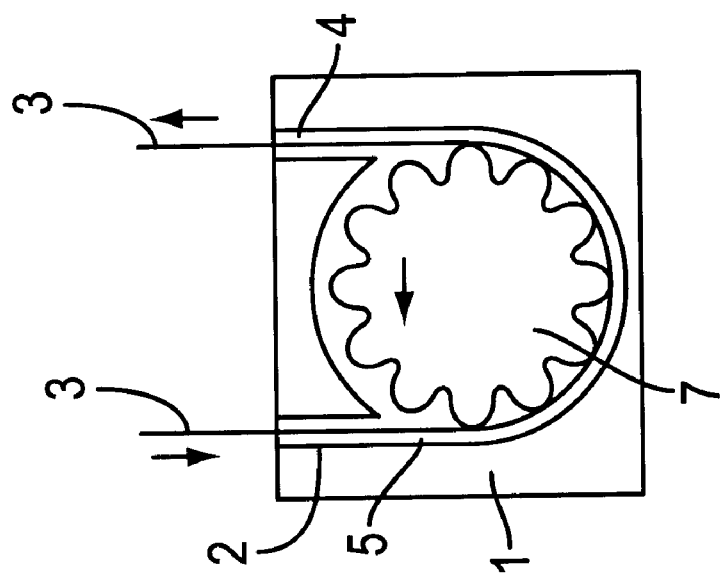
FIG. 2 shows, in an illustration according to FIG. 1, an impregnating appliance with a shearing element designed as a toothed disk.

Proceeding from the method described initially, some objects are achieved, according to the invention, for example, in that the thermoplastic melt forms an elongate impregnation stage, into which mechanical energy can be introduced continuously in order to reduce the melt viscosity, and in that the preheated fiber bundle is drawn continuously through the zone of reduced melt viscosity.

In terms of an apparatus for carrying out this method, objects can be achieved, according to the invention, for example, by means of a heated closed impregnating appliance, including at least one introduction nozzle for the fiber bundle to be impregnated, and a guide duct which connects the introduction nozzle to an outlet. The impregnating appliance is filled at least essentially with thermoplastic melt so that melt forms an elongate impregnation stage. The impregnating appliance generally has at least one supply line for the thermoplastic melt, and a supply line opening into this guide duct. The appliance is also preferably provided with at least one movable shearing element for applying mechanical energy to the thermoplastic melt in the guide duct.

1. According to the invention, therefore, the thermoplastic melt can be applied to the fiber bundle in a decentralized manner, that is, over a wide area. Even in the case of only one outlet orifice is employed in the feed conduit, a decentralized feed of the melt results from the rotary movement of the shear element. The decentralization of the melt feed is intensified by use of a star-shaped outlet from the feed conduit, the input also being made in this case too at the outer circumference. In order to accelerate and improve impregnation, the melt viscosity can be reduced, for example, by introducing shearing forces into the melt. According to the invention, it may be advantageous under some circumstances if the zone where the melt is fed and the zone where the fiber bundle is impregnated are superposed. In this case, it may be expedient if a transverse flow is imparted to at least part of the thermoplastic melt in the impregnation stage, that is, at the point where the melt is impregnated into the fiber bundle. This may be achieved, in terms of the apparatus, for example, by providing indentations in at least one wall of the guide duct.

According to the invention, in order to introduce mechanical energy into the thermoplastic melt, at least one movable shearing element is preferably used, which can be driven in any desired way. For example, the shearing element can be driven externally or else be set in rotation by the fiber bundle as the bundle is guided past the shearing element during processing. In this case, it is expedient if the fiber bundle is guided on a portion of the impregnating appliance which partially loops around the at least one shearing element.

In some cases, it may be advantageous if, on the one hand, high shearing forces can be introduced into the thermoplastic melt and, on the other hand, the dwell time of the thermoplastic melt in the impregnating appliance is reduced. As such, it is preferable that the guide duct that accommodates the impregnation stage of the melt be designed to be as narrow as possible and the guide duct should preferably guide the fiber bundle closely past the shearing element, so that the potential for reduction of the melt viscosity has the greatest effect.

According to the invention, as compared, for example, with the method according to DE 41 12 129 A1, the dwell time of the thermoplastic in the impregnating appliance can be shortened to some extent due to the decentralization of the melt feed. The dwell time can also be reduced if the melt feed and impregnation areas or zones are superposed due to the reduced melt viscosity. These dwell times are reduced, for example, due to the shearing which is introduced, which results in improved material properties. Depending for example, on the type of thermoplastic melt used and on the proportion of reinforcing fibers, improved properties under dynamic load or increased impact resistances are achieved. Furthermore, according to the invention, the rate of impregnation is increased.

According to the invention, as compared with the method according to EP 0,102,159 B1, the subsequent evaporation of the additive necessary in the prior art may not be required. According to the invention, therefore, less energy is typically required for impregnation. Moreover, in a method according to the invention, the dwell time of the thermoplastic melt under increased temperature is considerably shorter, this leading, inter alia, to improved product properties.

As compared with the methods according to EP 0,287,427 B1 and 0,415,571 A1, too, due to the decentralization of the melt feed and the reduction of the melt viscosity due to shearing, a method of the present invention has a shortened impregnation time and consequently, an increased impregnation quality, as well as an increase in the filament speed and/or a shortening of the dwell time. Since the shearing speed has a far greater influence on viscosity than the melt temperature, the melt temperature can be lowered and the impregnation quality can concurrently be increased. Before shearing of the polymer melt, the melt viscosity is advantageously between 90 and 500 PaS, during the shearing the viscosity can decrease, for example, to 20–60 PaS. The viscosity of the melt is determined by the molecular weight distribution, the temperature and the shearing speed. The melt viscosity that establishes itself at the fiber surface is not typically measurable experimentally, but rather is estimated mathematically.

By virtue of the introduction of mechanical energy into the thermoplastic melt and the thereby lowered viscosity of the thermoplastic melt and the increase in the transverse throughflow, a fiber bundle located in the appliance is not easily damaged mechanically. That is, fiber bundles treated according to the present method or using the present apparatus are generally not damaged during processing. A melt film formed on the surface of the fiber bundle obviously performs a protective function. By virtue of this effect, a dynamic concept (that is, the process is versatile in terms of types of melt that can be used) can be implemented in the polymer melt, instead of the hitherto industrially implemented static process, that requires spreading and deflection of the melt during processing. "Dynamic concept" refers to the reduction of the melt viscosity by the input of mechanical energy such as by shear. The resulting low process temperatures, shorter dwell times and improved impregnation have previously been implemented by an appliance configuration for thermoplastics having a viscosity, in the case of low shear, of <100 Pas. However, a design for higher-viscosity materials may also be envisaged. The preheating temperature of the fiber cluster is generally determined by the length and the temperature of the preheating section as well as the filament speed and the heat transfer coefficient.

Further features of the invention are the subject-matter of the subclaims and are explained in more detail, together with further advantages of the invention, with reference to exemplary embodiments.

Figure 1:
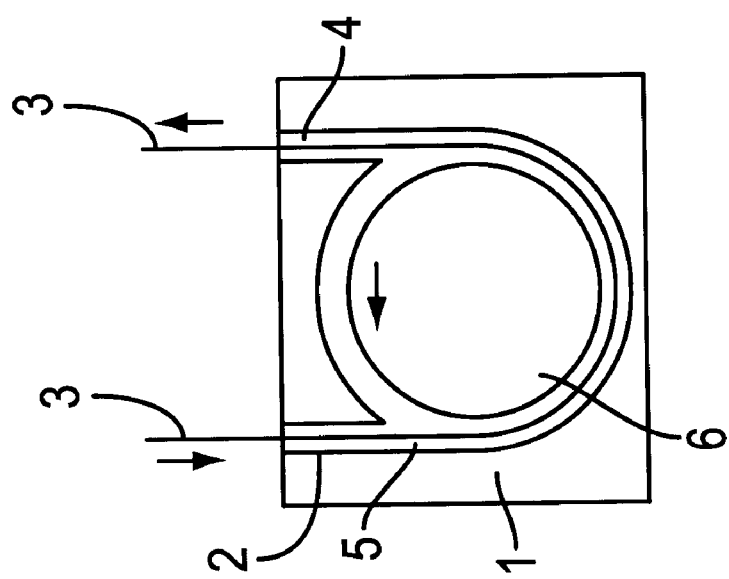
FIG. 1 shows a vertical section through an impregnating appliance with a disklike shearing element.

Some embodiments of the invention which serve as examples are illustrated diagrammatically in the drawing, in which:

2. FIG. 1 shows a heated impregnating appliance 1, with an introduction nozzle 2 for a fiber bundle 3 to be impregnated, with a guide duct 5 which connects the introduction nozzel 2 to an outlet 4. The guide duct 5 accommodates an elongate impregnation stage of thermoplastic melt and can be filled at least essentially with the thermoplastic melt, and with a shearing element, suitably in the form of a circular disk 6, which is rotatable in the direction of the arrow indicated and which applies mechanical energy to the thermoplastic melt in the guide duct 5. The size of the guide duct is generally dependent upon the allowable bending radius of the fibers used and on the necessary dwell time. The diameter of the shearing elements should preferably be made as small as possible in order to achieve the broadest possible fanning out of the fiber clusters. Shearing element diameters between 40 mm and 400 mm are especially advantageous in some circumstances. The necessary dwell time of the fiber clusters is first of all a function of the fiber diameter and the melt viscosity. The finer the fibers and the more viscous the polymer melt, the longer the dwell time of the fiber clusters must be made. Dwell times between 0.5 seconds and 80 seconds are advantageous in some circumstances.

The length of the introduction nozzel 2 is preferably dimensioned in such a way that the fiber bundle 3 to be impregnated, when being introduced into the impregnating appliance 1, is preheated by contact heat at least approximately to the temperature of the thermoplastic melt located in the guide duct 5.

The preferable direction the fiber bundle 3 travels is marked by the arrows indicated. The conveying direction in the outlet 4 is therefore generally opposite to that in the introduction nozzel 2. The fiber bundle 3 loops around the disk 6 over approximately 180 degrees of circumference and is preferably adjacent to or at least only a short clear distance from the circumferential surface of the disk 6. The disk can be rotated continuously by an external drive, in order to move in the zone of reduced melt viscosity which is brought about by the introduction of mechanical energy into the thermoplastic melt by virtue of the driven disk 6.

Figure 4:
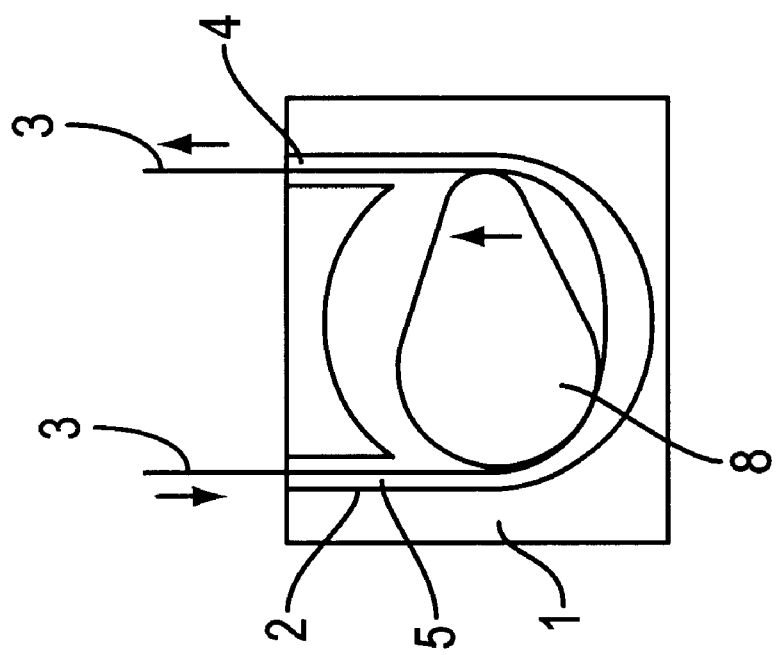
FIG. 4 shows, in an illustration according to FIG. 1, an impregnating appliance with a camlike shearing element.

The embodiments according to FIGS. 2 and 4 correspond essentially to that of FIG. 1, the shearing element in FIG. 2 being designed as a toothed disk 7 and in FIG. 4 as a camlike disk 8. At the same time, the shearing elements 7, 8 of FIGS. 2 and 4 may be mounted as freely rotatable and can be set in rotation by the fiber bundle 3 drawn past the shearing elements.

Figure 3:
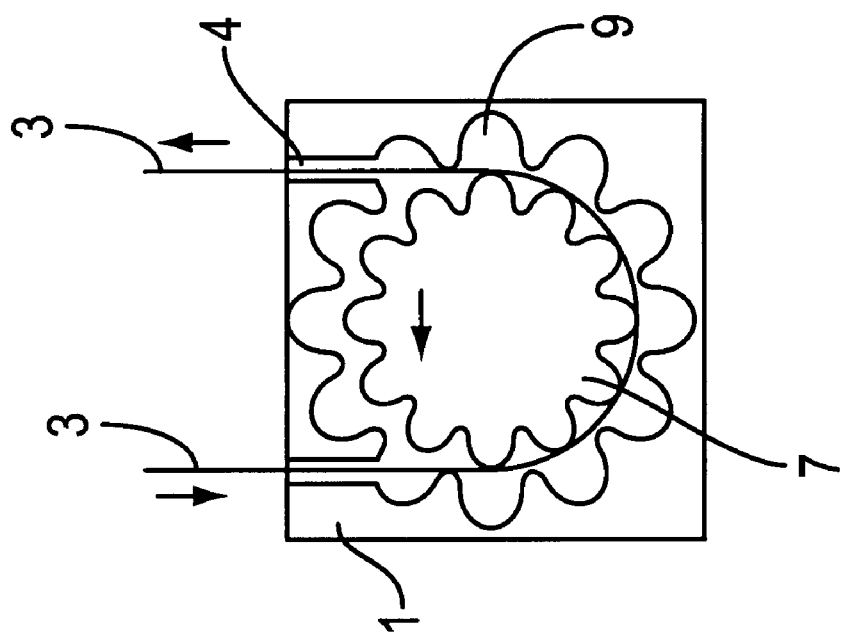
FIG. 3 shows, in an illustration according to FIG. 2, an impregnating appliance with indentations in the guide duct.

The impregnating appliance according to FIG. 3 corresponds to that of FIG. 2. However, the appliance of FIG. 3 additionally has indentations 9 provided in the wall of the guide duct 5, by means of which a transverse flow can be imparted to part of the thermoplastic melt within the guide duct 5.

Figure 5:
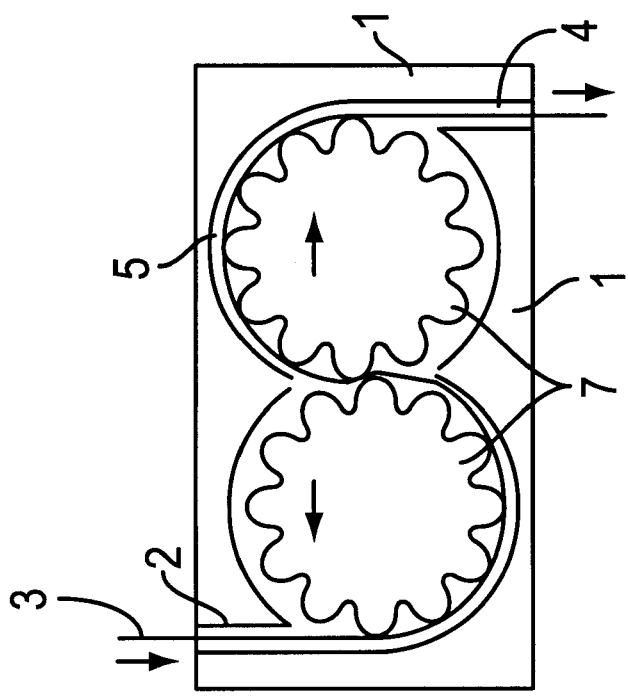
FIG. 5 shows, in an illustration according to FIG. 1, an impregnating appliance with two shearing elements each designed as a toothed disk.

In the embodiment according to FIG. 5, the fiber bundle 3 is guided around two toothed disks 7, arranged adjacent or closely next to one another, in such a way that the entry direction of the fiber bundle 3 corresponds to its exit direction, that is the entry and exit of the fiber bundle is in the same general direction.

Figure 6:
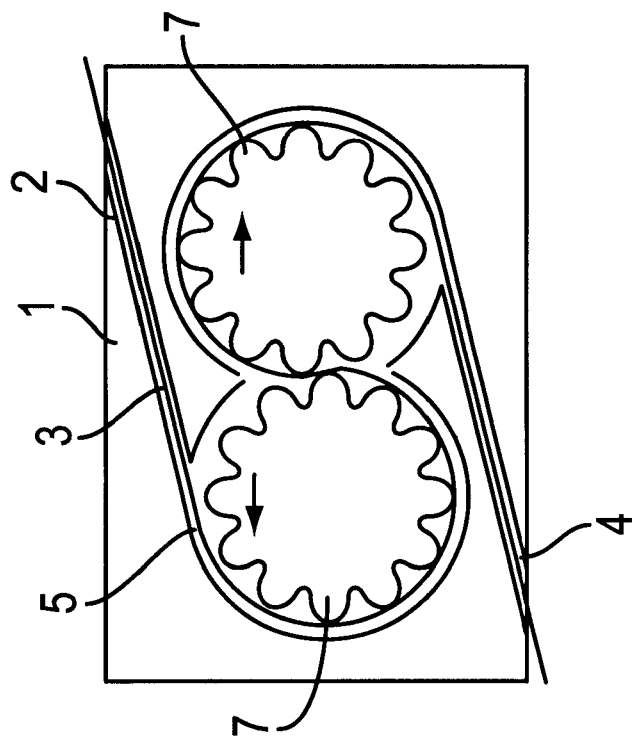
FIG. 6 shows an impregnating appliance according to FIG. 5 with displaced introduction nozzles for a fiber bundle.

In the embodiment according to FIG. 6, the introduction nozzel 2 and the outlet 4 have been displaced, in the impregnating appliance according to FIG. 5, in such a way that an oblique entry and exit are obtained; that is the entry and exit are located obliquely to each other. As a result, the dwell time of the fiber bundle 3 in the impregnating appliance 1 is lengthened, when the filament speed (that is, the speed the bundle is moving) remains the same. Moreover, the looping angle made by the fiber bundle 3 is enlarged on each of the two tooth disks 7.

Figure 7:
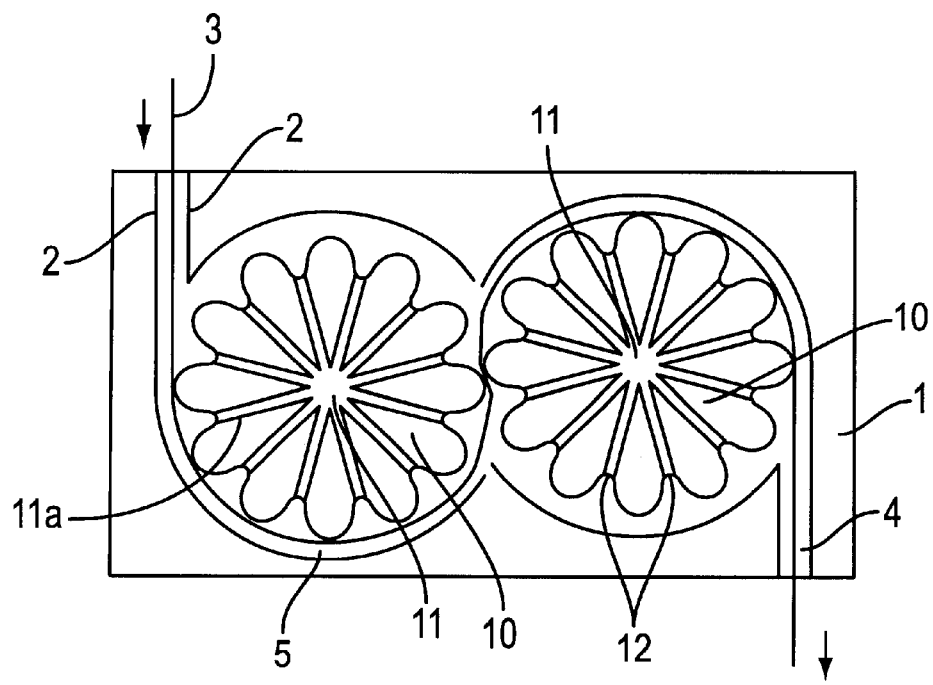
FIG. 7 shows, in an illustration according to FIG. 5, an impregnating appliance with two disklike shearing elements, in each case with axial and radial supply lines for the thermoplastic melt.

3. The embodiment according to FIG. 7 corresponds essentially to that of FIG. 5. Here, the shearing elements comprise two disks 10 which are arranged adjacent or next to one another and which each have an axial supply line 11 for the thermoplastic melt. The supply lines are preferably axial and open out in a starlike manner onto the shearing surface of the disk 10; that is, the supply line 11 permits the melt to be supplied at multiple points, preferably spreading radially outwards as shown for example in FIG. 7. In addition, the supply line 11 can be slitlike transversely to the fiber direction of the fiber bundle being guided within the appliance 1. Preferably the length of the slits or slitlike openings correspond with the width of the fiber bundle. Suitably the width of the slitlike openings are at most half the length thereof. To permit decentralization of the melt feed, the individual openings 12 are preferably arranged in a recessed manner in the circumferential surface forming the shearing surface of the shearing element. The use of smaller widths for the outlet orifice of the feed conduit corresponds with greater pressure losses of the tool but higher shear applied to the melt. A width of 0.2–5 mm at a length of 3–10 mm can be advantageous in some circumstances.

Figure 8:
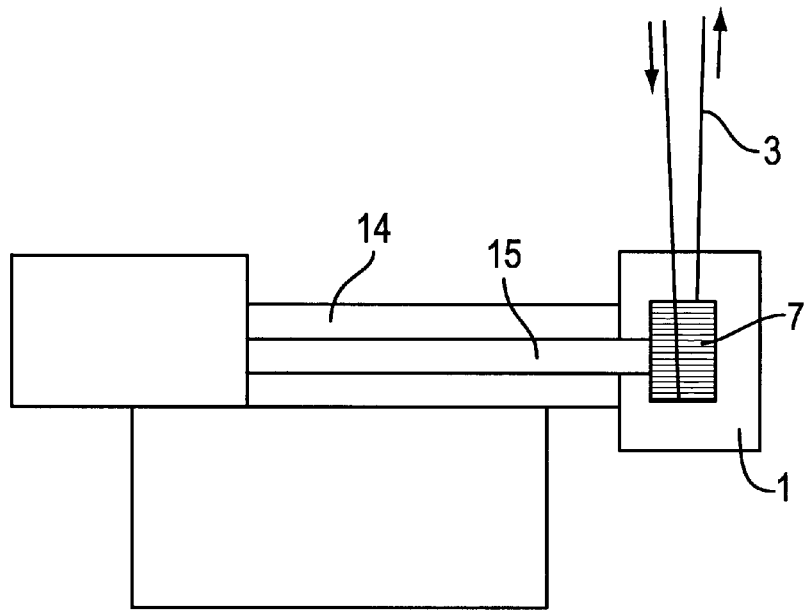
FIG. 8 shows an impregnating appliance according to FIG. 2, rotated through 90° and mounted on a single-screw extruder.

FIG. 8 shows, highly diagrammatically, a screw extruder 14, on a screw 15. The shearing element 7 of an impregnating appliance 1, is designed as a toothed disc 7 which is flanged or rotationally connected to the screw 15. Useful matrix compositions and dwell conditions are set forth below in the following Table 1.

TABLE 1

| No. | Matrix | Fiber | Fiber Content | Dwell times | Temperature |
|---|---|---|---|---|---|
| 1 | PA 12 | Glass | 40 wt.-% | 0.6 | 300 |
| 2 | PA 6 | Carbon | 20 wt.-% | 30 | 300 |
| 3 | PA 66 | Carbon | 25 wt.-% | 18 | 320 |
| 4 | PP | Glass | 60 wt.-% | 0.5 | 300 |
| 5 | PE | Glass | 50 wt.-% | 0.8 | 320 |

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

As used herein, the articles, "a", "an", "the" and the like can designate the singular or plural of the object that follows.

The priority document, German Patent Application No. DE 198 15 184.5 filed Apr. 4, 1998 is incorporated herein by reference in its entirety including the title, abstract, specification, drawings and claims.

We claim:

1. An apparatus for the production of continuous composite materials by impregnating a fiber bundle with thermoplastic melt, comprising:

a partially closed impregnating appliance, said impregnating appliance comprising:
(i) at least one inlet for a fiber bundle to be impregnated;
(ii) an outlet for the composite material;
(iii) an impregnation passageway which connects the inlet to the outlet;
(iv) at least one supply line for supplying thermoplastic melt to said appliance, said supply line opening into said impregnation passageway; and
(v) a pair of movable shearing elements for applying mechanical energy to the thermoplastic melt in the impregnation passageway, said shearing elements comprising two closely adjacent toothed wheels which are freely rotatable or are provided with an external rotary drive and which around them and between them define said impregnation passageway in which mechanical energy is imparted to the thermoplastic melt, wherein said supply line for the thermoplastic melt opens in the outer circumference of at least one of said rotatable toothed wheels.

2. An apparatus as claimed in claim 1, wherein said supply line includes a slit opening that is oriented transversely to the fiber direction of the fiber bundle guided past said supply line.

3. An apparatus as claimed in claim 2, wherein the length of the slit opening corresponds approximately to the width of the fiber bundle.

4. An apparatus as claimed in claim 3, wherein the width of the slit opening corresponds at most to half the length of the slit opening.

5. An apparatus as claimed in claim 1, wherein in said supply line is arranged such that it extends axially with respect to at least one of said toothed wheels and opens out to form a star pattern.

6. An apparatus as claimed in claim 1, wherein said rotatable toothed wheels are rotationally connected to a screw of a screw extruder.

7. A method for the production of continuous composite materials by impregnating a fiber bundle with thermoplastic melt by using an apparatus as claimed in claim comprising:

using said apparatus preheating a bundle of continuous reinforcement fibers;

introducing the preheated fiber bundle to be impregnated into said inlet of said appliance;

supplying thermoplastic melt to said appliance through said at least one supply line, said supply line opening into said impregnation passageway in the outer circumference of at least one of said rotatable toothed wheels; and passing said fiber bundle through said impregnation passageway which is formed around and between said pair of movable shearing elements;

applying mechanical energy to the thermoplastic melt in the impregnation passageway by rotation of said pair of movable shearing elements; and withdrawing the composite from said outlet.

8. A method as claimed in claim 7, wherein a transverse flow is imparted to at least part of the thermoplastic melt in said impregnation passageway.

9. A method as claimed in claim 7, wherein at least one of said shearing elements is driven externally.

10. A method as claimed in claim 7, wherein at least one of said shearing elements is set in rotation by the fiber bundle guided past said at least one of said shearing elements.

11. A method as claimed in claim 7, wherein the fiber bundle is guided around at least one of said shearing elements.

12. A method as claimed in claim 7, wherein the fiber bundle is guided around both said shearing elements.

13. A method as claimed in claim 7, wherein the preheating of the fiber bundle is carried out by contact heat when the fiber bundle is introduced into said appliance.

* * * * *

UNITED STATES PATENT AND TRADEMARK OFFICE
CERTIFICATE OF CORRECTION

PATENT NO.     : 6,228,432 B1
DATED          : May 8, 2001
INVENTOR(S)    : Juergen Deinert et al.

It is certified that error appears in the above-identified patent and that said Letters Patent is hereby corrected as shown below:

Title page,
Insert:
-- [73] Otto Bock orthopaedische industrie besitz-und verwaltungs-kommanditgesellschaft, Duderstadt, Federal Republic of Germany --.

Signed and Sealed this

Ninth Day of July, 2002

Attest:

Attesting Officer

JAMES E. ROGAN
*Director of the United States Patent and Trademark Office*